(12) United States Patent
Matteucci

(10) Patent No.: US 8,347,714 B2
(45) Date of Patent: Jan. 8, 2013

(54) ILLUMINATION DEVICES FOR BALANCING MACHINE FOR BALANCING VEHICLE WHEELS

(75) Inventor: Marco Matteucci, Rio Saliceto (IT)

(73) Assignee: SICAM S.r.l., Correggio (RE) (IT)

( * ) Notice: Subject to any disclaimer, the term of this patent is extended or adjusted under 35 U.S.C. 154(b) by 685 days.

(21) Appl. No.: 12/585,328

(22) Filed: Sep. 11, 2009

(65) Prior Publication Data

US 2010/0139398 A1    Jun. 10, 2010

(30) Foreign Application Priority Data

Dec. 9, 2008  (IT) .............................. MO2008A0229

(51) Int. Cl.
*G01M 1/08* (2006.01)
(52) U.S. Cl. .......................................... 73/487; 73/462
(58) Field of Classification Search ................... 73/462, 73/487; 301/5.21
See application file for complete search history.

(56) References Cited

U.S. PATENT DOCUMENTS

| | | | |
|---|---|---|---|
| 5,827,964 A | | 10/1998 | Douine |
| 5,831,152 A | * | 11/1998 | Rothamel .......................... 73/66 |
| 7,191,651 B2 | | 3/2007 | Douglas et al. |
| 7,355,687 B2 | | 4/2008 | Voeller et al. |
| 2008/0150348 A1 | * | 6/2008 | Douglas et al. .............. 301/5.21 |

* cited by examiner

*Primary Examiner* — John Chapman, Jr.
(74) *Attorney, Agent, or Firm* — Stein McEwen, LLP

(57) ABSTRACT

The balancing machine for balancing vehicle wheels includes a base frame for supporting a balancing shaft, which receives the vehicle wheel. A plurality of light sources are arranged in a ring around the balancing shaft, and a plurality of pattern generators projects images onto the side of the wheel to form reference points. The light sources are split into sectors, and at least one pattern generator is arranged between two sectors of the light sources. Laser pointers may be used as pattern generators.

10 Claims, 2 Drawing Sheets

ILLUMINATION DEVICES FOR BALANCING MACHINE FOR BALANCING VEHICLE WHEELS

The present invention relates to a balancing machine for balancing vehicle wheels.

BACKGROUND OF THE INVENTION

It is known that the wheels of vehicles circulating on the road require frequent balancing operations, consisting in fitting to the wheel rim small balancing weights, made of lead or other material, suitable for offsetting the irregular distribution of weights in the tire.

To perform this operation, balancing machines are commonly used with a horizontal rotating shaft, so-called "balancing shaft", on which the wheel to be balanced must be placed integral by means of one or more centering and fixing parts.

The measurement of wheel unbalance is determined once the wheel has been rotated on the balancing shaft by means of a series of electronic or electro-mechanical devices, such as force transducers fitted along the balancing shaft.

To the unbalance measurement are normally added other characteristic measurements, such as wheel roundness measurement, wheel eccentricity, amount of tread wear, etc., normally made by means of suitable measuring sensors without contact (laser, ultrasounds or the like), mounted on the machine frame and substantially turned towards the balancing shaft.

Once the necessary measurements have been made, the machine is able to calculate the quantity of the balancing weights to be fitted on the wheel rim to offset the wheel irregularities.

The balancing weights are usually fitted manually by an operator at one or more precise points of the wheel rim chosen by the machine or the operator himself.

The weight fitting operation is not always practical and easy, above all because the balancing weight fitting points are located inside the wheel rim and therefore not well lit.

To overcome this drawback, the operator can use an electric lamp of the type used in workshops with the drawback, however, of having to fit the balancing weights with just one hand, because the other hand must be used to direct the light inside the wheel rim.

Particular types of balancing machines on the other hand have a halogen lamp located roughly underneath the balancing shaft and intended to light up the inner face of the wheel.

The lighting of such halogen lamps however is not perfect and is often partial because the light produced is not diffused in a uniform way and comes from a single point of emission, i.e., the lamp itself.

This therefore determines the splitting up of the rim area into well lit areas and shadow areas.

Another drawback of traditional balancing machines which restricts the practical intervention of the operator in fitting the balancing weights consists in the fact that the operator is not always able to correctly identify the precise point at which to fit the weights, which usually coincides with the position corresponding to "12 o'clock".

In this respect, it is specified that in this treatise by the expressions "3 o'clock", "6 o'clock", "9 o'clock" and "12 o'clock" are meant the relevant angular positions on the wheel perimeter hypothetically split up into twelve hours like the dial of a clock, where "6 o' clock" and "12 o'clock" are therefore defined by the intersection of the wheel with the vertical plane on which the balancing shaft rests, while "3 o'clock" and "9 o'clock" are defined by the intersection of the wheel with the horizontal plane on which the balancing shaft rests.

To identify "12 o'clock" on the wheel, the operator ideally traces the vertical line passing through the balancing shaft and positions the balancing weights by evaluating their position approximately, with the risk of this not being exact.

To overcome this drawback, some balancing machines have a laser pointer mounted on a series of linear and/or angular actuators which allow moving it to direct the light beam towards the exact point of the wheel in which the operator has to fit the balancing weights.

These mobile laser pointers also however have various drawbacks including the fact that they are particularly complex and expensive and that sometimes, despite their presence, the operator, to keep things simple and/or by habit, continues to adopt the balancing weight fitting system at "12 o'clock".

BRIEF SUMMARY OF THE INVENTION

The main aim of this invention is to provide a balancing machine for balancing vehicle wheels that is practical, easy and functional to use and which enables the operator to fit the balancing weights without too much difficulty and above all in a quick and precise way.

Another object of the present invention is to provide a balancing machine for balancing vehicle wheels which allows to overcome the mentioned drawbacks of the background art in the ambit of a simple, rational, easy, effective to use and low cost solution.

The above-described objects are achieved by the present balancing machine for balancing vehicle wheels, comprising at least a base frame supporting at least a balancing shaft for balancing at least a vehicle wheel and illumination means for illuminating said wheel, characterised in that said illumination means comprise a plurality of light sources arranged substantially around said balancing shaft.

Other characteristics and advantages of the present invention will become more evident from the description of a preferred, but not sole, embodiment of a balancing machine for balancing vehicle wheels, illustrated purely as an example but not limited to the annexed drawings.

DETAILED DESCRIPTION OF THE INVENTION

Figure 1:
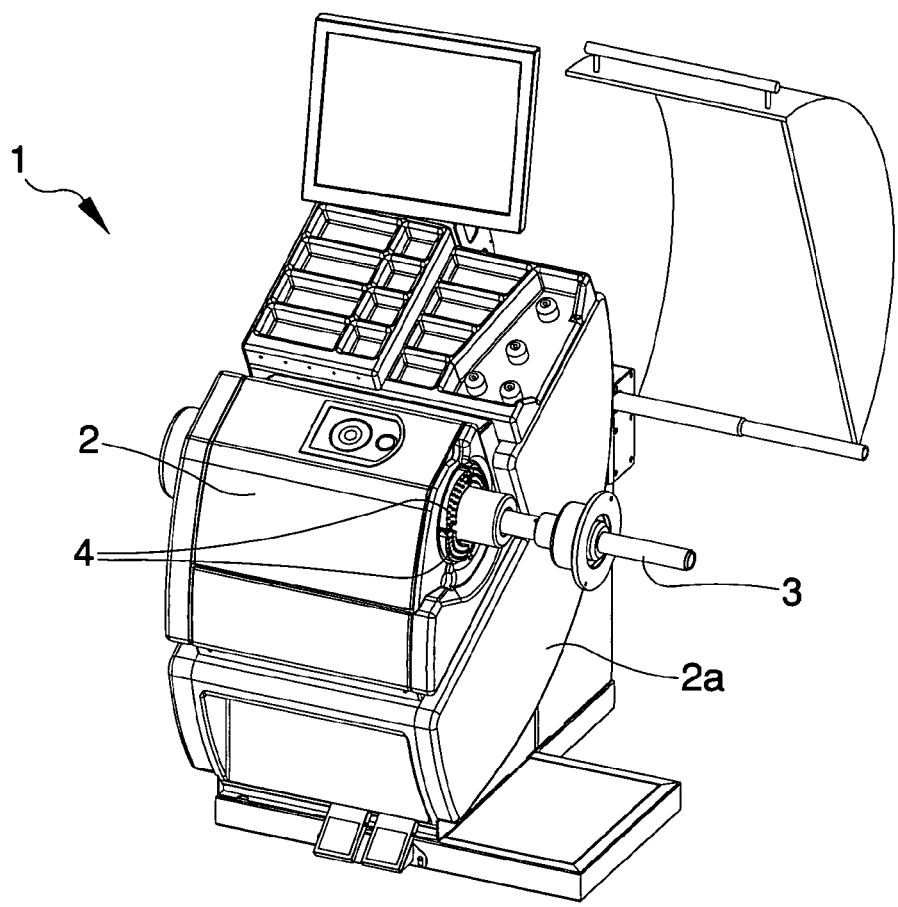
FIG. 1 is an axonometric view of the machine according to the invention.
Figure 2:
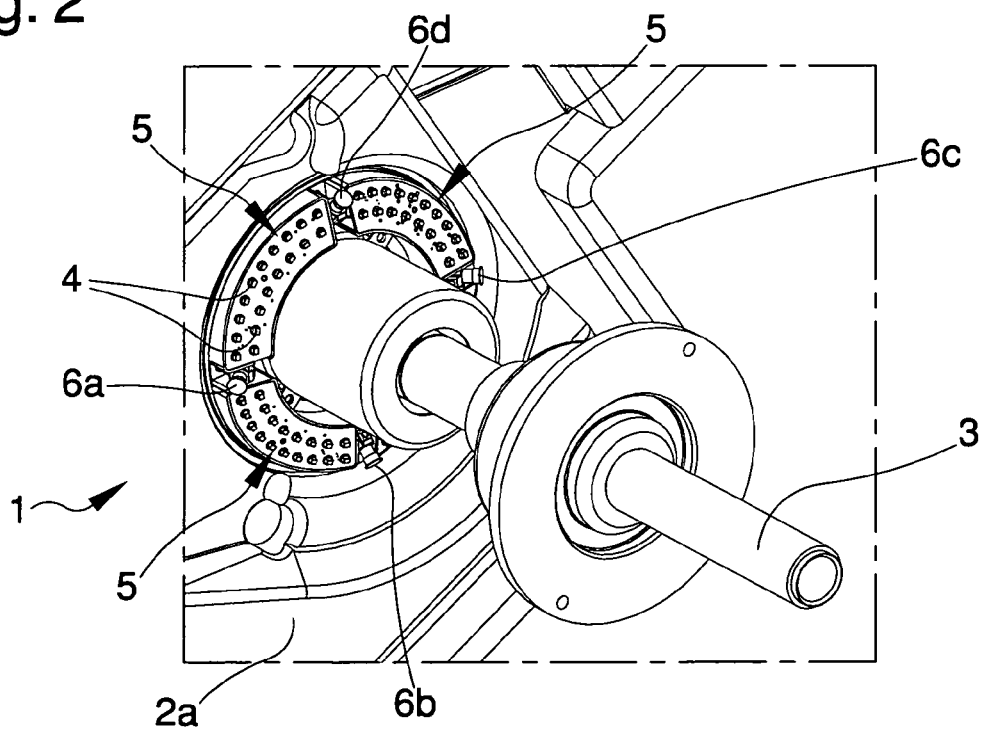
FIG. 2 is an axonometric view, on an enlarged scale, of a detail of FIG. 1.
Figure 3:
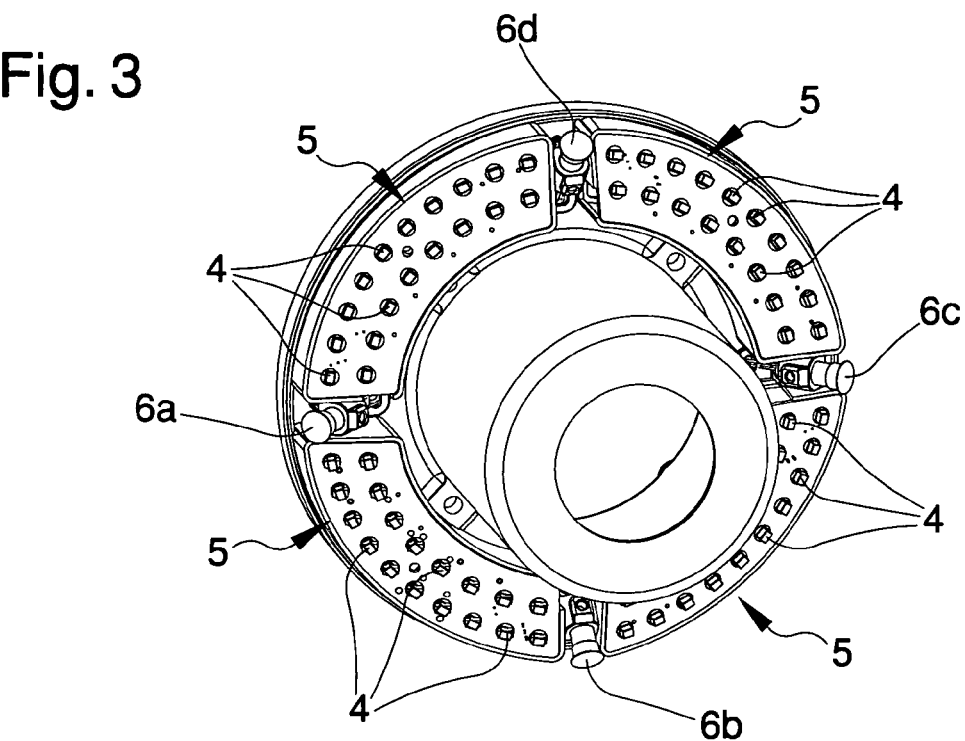
FIG. 3 is an axonometric view, on an enlarged scale, of the illumination means of the machine according to the invention.
Figure 4:
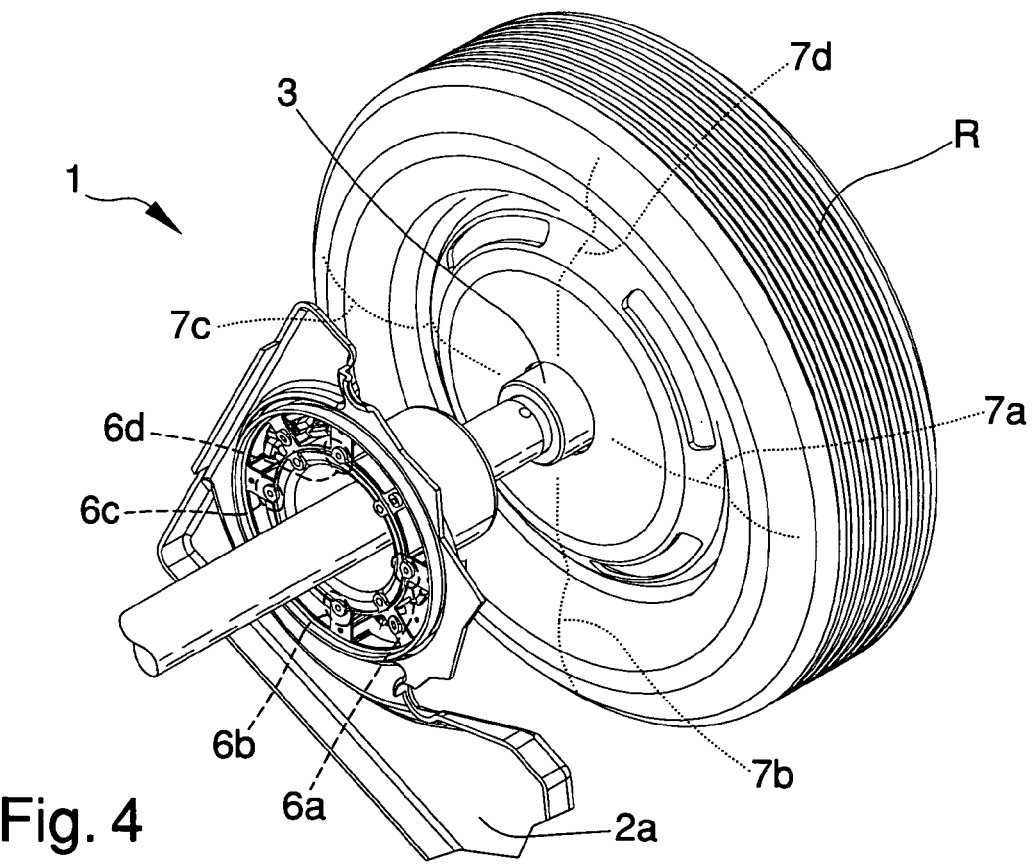
FIG. 4 is an axonometric view from another angle of the machine according to the invention during the balancing of a wheel.

With reference to such figures, a balancing machine for balancing vehicle wheels is indicated generally by reference numeral 1.

The machine 1 comprises a base frame 2 for resting on the ground, which supports a balancing shaft 3 onto which must be keyed a vehicle wheel R to be balanced. The base frame 2, in particular, is made up of a main block with a substantially vertical side panel 2a from which the balancing shaft 3 protrudes overhanging along a horizontal direction.

Once mounted on the balancing shaft 3, the wheel R has a side surface turned and facing the side panel 2a of the main block 2.

The main block 2, in detail, contains the motor means for operating the balancing shaft 3 in rotation around its own axis, as well as the equipment and the devices for detecting and correcting the unbalance of the wheel R.

Usefully, the machine 1 has illumination means 4 intended to light the inner surface of the wheel R once this has been mounted on the balancing shaft 3 to help the operator during the balancing weight fitting operation.

Such illumination means 4 are defined by a plurality of light sources arranged around the balancing shaft 3.

The light sources 4, in particular, are associated with the side panel 2a of the main block 2 substantially at the point of connection of the balancing shaft 3 with the base frame 2 and are arranged in a ring pattern around the balancing shaft 3.

More in detail, the light sources 4 are made up of a series of LEDs directed towards the side surface of the wheel R which faces the side panel 2a of the base frame 2.

In this respect, it is specified that the LEDs 4 are arranged so that the light beam emitted by them is substantially directed along a direction mostly parallel with the balancing shaft 3.

The LEDs 4 are split up into distinct groups to form a plurality of sectors 5.

In all, there are four sectors 5 and each of them extends around the balancing shaft 3 on a circumference arc substantially corresponding to a 90° angle, so that together they cover all the 360° around the balancing shaft 3.

The sectors 5 can be started all together, so as to light up all the inner surface of the wheel R, or independently the one from the other, so as to light up only the part of the wheel R of actual interest for the operator.

Advantageously, the machine 1 has a plurality of pattern generators 6a, 6b, 6c, 6d arranged substantially around the balancing shaft 3 and suitable for projecting at least an image onto the wheel R to identify a series of reference points thereon.

For example, the pattern generators 6a, 6b, 6c, 6d are made up of laser pointers the image of which projected onto the wheel R consists in a centripetal line 7a, 7b, 7c, 7d, i.e., which is substantially directed towards the centre of the wheel R.

In the particular embodiment of the invention shown in the illustrations, there are four laser pointers 6a, 6b, 6c, 6d staggered at 90° the one from the other.

More in detail, the four laser pointers 6a, 6b, 6c, 6d are arranged in the positions corresponding to "3 o'clock", "6 o'clock", "9 o'clock" and "12 o'clock" respectively and they project an equal number of centripetal lines 7a, 7b, 7c, 7d on the wheel R.

The laser pointers 6a, 6b, 6c, 6d are integrated with the illumination means 4 and are inserted between two adjacent sectors 5.

Once mounted on the side panel 2a of the base frame 2, furthermore, they are fixed and project centripetal lines 7a, 7b, 7c, 7d always in the same direction of space, identifying on the wheel R four cardinal reference points that help the operator during the fitting of the balancing weights.

Advantageously, the amplitude of the laser beam projected by the laser pointers 6a, 6b, 6c, 6d is such as to ensure a length of the centripetal lines 7a, 7b, 7c, 7d sufficient to adapt to all the sizes of wheels R that can be fitted on the machine 1 and, in particular, both small wheels and large wheels.

Finally, alternative embodiments of the invention cannot be ruled out in which a different number of laser pointers 6a, 6b, 6c, 6d are present, as in the case in which, for example, only one is envisaged arranged at "12 o'clock", or eight are envisaged staggered and with constant pitch to split the perimeter of the wheel R up into a greater number of sections.

It has in fact been ascertained how the described invention achieves the proposed objects.

In this respect, it must be underlined that the special solution of providing a series of light sources around the balancing shaft permits lighting up the inside of the wheel to be balanced with a diffused light, in a uniform and complete way.

By lighting up all the LED sectors or just one of these, furthermore, it is possible to light up the whole wheel or only the area of actual interest for the operator.

Furthermore it should be noted that the presence of the fixed laser pointers which in case of need are able to identify one or more cardinal points of reference on the wheel, permits, with a simple and practical system, considerably facilitating the fitting of the balancing weights.

In fact, unlike what happens with traditional balancing machines in which the operator is forced to approximately evaluate the "12 o'clock" position, with the machine according to the invention this position and the "3 o'clock", "6 o'clock" and "9 o'clock" positions are easily identified by means of the laser pointers.

Other modifications may occur to the skilled artisan in the field of balancing machines for vehicle wheels. Hence, the appended claims should be broadly construed in a manner commensurate with applicant's inventive efforts, and should not be limited to their literal terms.

What is claimed is:

1. A balancing machine for balancing vehicle wheels, comprising:
    a) a base frame supporting a balancing shaft for balancing a vehicle wheel;
    b) illumination means for illuminating said wheel;
    c) said illumination means comprising a plurality of light sources arranged around said balancing shaft,
    d) said illumination means further comprising a plurality of pattern generators, each pattern generator adapted to project an image onto said wheel for identifying at least a reference point thereon;
    e) said light sources being split into a plurality of sectors;
    f) said plurality of pattern generators being arranged around said balancing shaft; and
    g) at least one of said plurality of pattern generators also being arranged between two of said sectors.

2. The machine according to claim 1, wherein said light sources are arranged in a ring pattern around said balancing shaft.

3. The machine according to claim 1, wherein at least one of said sectors extends around said balancing shaft substantially along an arc of 90°.

4. The machine according to claim 1, wherein said light sources are at least in part directed towards said wheel mounted on said balancing shaft.

5. The machine according to claim 1, wherein the light beam emitted by said light sources is oriented in a direction parallel to said balancing shaft.

6. The machine according to claim 1, wherein said light sources are LEDs.

7. The machine according to claim 1, wherein said illumination means are associated to said base frame substantially at the point of connection of said balancing shaft with said base frame.

8. The machine according to claim 1, wherein each of said pattern generators is a laser pointer.

9. The machine according to claim 1, wherein said image projected on said wheel is substantially a line.

10. The machine according to claim 1, wherein at least one of said pattern generators is arranged in a position selected from the list consisting of: "3 o'clock", "6 o'clock", "9 o'clock" and "12 o'clock".

* * * * *